(12) United States Patent
McHugh

(10) Patent No.: US 6,746,225 B1
(45) Date of Patent: Jun. 8, 2004

(54) RAPID SOLIDIFICATION PROCESSING SYSTEM FOR PRODUCING MOLDS, DIES AND RELATED TOOLING

(75) Inventor: Kevin M. McHugh, Idaho Falls, ID (US)

(73) Assignee: Bechtel BWTX Idaho, LLC, Idaho Falls, ID (US)

( * ) Notice: Subject to any disclaimer, the term of this patent is extended or adjusted under 35 U.S.C. 154(b) by 0 days.

(21) Appl. No.: 09/592,003

(22) Filed: Jun. 12, 2000

Related U.S. Application Data

(63) Continuation-in-part of application No. 09/023,037, filed on Feb. 13, 1998, now Pat. No. 6,074,194, which is a continuation of application No. 08/320,032, filed on Oct. 7, 1994, now Pat. No. 5,718,863, which is a continuation-in-part of application No. 07/983,459, filed on Nov. 30, 1992, now abandoned.

(51) Int. Cl.⁷ .............................................. B29C 41/08
(52) U.S. Cl. .................. 425/130; 425/375; 425/447; 425/470; 264/309; 164/20; 164/21; 164/46; 164/66.1
(58) Field of Search .............................. 425/130, 375, 425/447, 470; 264/309; 164/19, 20, 21, 46, 66.1

(56) References Cited

U.S. PATENT DOCUMENTS

| | | | | |
|---|---|---|---|---|
| 3,784,152 A | * | 1/1974 | Garner et al. | |
| 3,899,820 A | * | 8/1975 | Read et al. | 419/23 |
| 4,066,117 A | * | 1/1978 | Clark et al. | |
| 4,919,853 A | * | 4/1990 | Alvarez et al. | |
| 4,938,275 A | * | 7/1990 | Leatham et al. | |
| 4,960,752 A | * | 10/1990 | Ashok et al. | |
| 4,999,225 A | * | 3/1991 | Rotolico et al. | |
| 5,171,360 A | * | 12/1992 | Orme et al. | 75/331 |
| 5,225,004 A | * | 7/1993 | O'Handley et al. | 148/101 |
| 5,257,657 A | * | 11/1993 | Gore | |
| 5,980,604 A | * | 11/1999 | Lavernia | 75/338 |
| 6,296,043 B1 | * | 10/2001 | Bowen et al. | |

OTHER PUBLICATIONS

Watson et al., "Nozzle–Aspirated Metal Forming", EG&G Idaho, inc., paper presented at the International Symposium of Castin of Near Net Shape Products, sponsored by the Metallurgical Society, Honolulu, Hawaii, Nov., 1988.*

* cited by examiner

Primary Examiner—Robert Davis
Assistant Examiner—Joseph S. Del Sole
(74) Attorney, Agent, or Firm—Dahl & Osterloth LLP

(57) ABSTRACT

A system for the spray forming manufacturing of near-net-shape molds, dies and related toolings, wherein liquid material such as molten metal, metallic alloys, or polymers are atomized into fine droplets by a high temperature, high velocity gas and deposited onto a pattern. Quenching of the in-flight atomized droplets provides a heat sink, thereby allowing undercooled and partially solidified droplets to be formed in-flight. Composites can be formed by combining the atomized droplets with solid particles such as powders, whiskers or fibers.

21 Claims, 8 Drawing Sheets

Nozzle Information

- Nozzle Information: 14.0°
- Exit Angle 14.0°
- Distance from Liquid Orifice
  to Nozzle Exit (inches) 1.018
- Number of Orifices 6.0
- Orifice Area (square inches) 0.000314
- Total Area of Liquid
  Orifices (square inches) 0.0019
- Cross Sectional Area of
  Nozzle Throat (square inches) 0.06
- Cross Sectional Area of Gas Stream
  at Nozzle Exit (square inches) 0.266

Fig. 4A

| Run Time (sec) | TC#1 (°C) | TC#2 (°C) | TC#3 (°C) | TC#4 (°C) | TC#5 (°C) | TC#6 (°C) | Argon TC#7 (°C) | Gas Flow (slpm) |
|---|---|---|---|---|---|---|---|---|
| 45.5 | 309.7 | 165.3 | 107.7 | 100.6 | 86.0 | 79.5 | 74.8 | 253.7 |
| 105.5 | 318.8 | 190.5 | 122.6 | 113.5 | 92.9 | 83.9 | 79.1 | 283.6 |
| 165.5 | 318.0 | 199.0 | 129.8 | 120.1 | 97.3 | 87.0 | 81.6 | 305.8 |
| 215.5 | 324.6 | 201.3 | 134.5 | 124.8 | 101.0 | 90.0 | 83.9 | 329.5 |
| 285.5 | 311.7 | 200.0 | 136.0 | 127.0 | 102.5 | 91.1 | 85.2 | 355.9 |
| 345.5 | 295.9 | 196.6 | 135.3 | 127.0 | 102.5 | 90.6 | 84.6 | 381.2 |
| 405.5 | 279.9 | 194.4 | 135.1 | 127.2 | 102.9 | 91.2 | 85.1 | 412.2 |
| 465.5 | 266.9 | 190.6 | 133.4 | 126.2 | 101.9 | 90.6 | 84.1 | 439.3 |
| 525.5 | 251.8 | 186.0 | 131.9 | 125.4 | 101.4 | 90.1 | 84.2 | 474.7 |
| 585.5 | 233.4 | 180.1 | 130.3 | 123.8 | 100.4 | 89.5 | 83.7 | 504.5 |

Distance from Nozzle Exit (inches)

| | 0.125 | 1.25 | 2.25 | 3.25 | 4.375 | 5.312 | 6.187 | |

Fig. 4B

| Gas Temperature Nozzle Inlet (°C) | Nozzle Temperature Liquid Orifice (°C) | Chamber Temperature (°C) | Nozzle Inlet Pressure (psia) |
|---|---|---|---|
| 552.7 | 347.9 | 38.0 | 15.096 |
| 555.8 | 356.7 | 39.0 | 16.168 |
| 557.2 | 362.7 | 39.7 | 17.074 |
| 548.5 | 365.0 | 40.0 | 18.020 |
| 527.3 | 364.1 | 41.1 | 19.003 |
| 501.7 | 359.3 | 41.9 | 19.926 |
| 476.0 | 350.9 | 42.0 | 20.982 |
| 453.9 | 340.9 | 43.4 | 21.928 |
| 429.2 | 329.3 | 44.0 | 23.054 |
| 409.0 | 317.4 | 44.1 | 23.968 |

Fig. 4B

RAPID SOLIDIFICATION PROCESSING SYSTEM FOR PRODUCING MOLDS, DIES AND RELATED TOOLING

This is a continuation-in-part of U.S. application Ser. No. 09/023,037, filed Feb. 13, 1998, now U.S. Pat. No. 6,074,194, which is a continuation of U.S. application Ser. No. 08/320,032, filed Oct. 7, 1994, now U.S. Pat. No. 5,718,863, which is a continuation-in-part of 07/983,459, filed on Nov. 30, 1992, now abandoned, all hereby incorporated by reference.

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

BACKGROUND OF THE INVENTION

This invention relates to a method for the production of dies and molds and more particularly to a spray forming process for the deposition and rapid solidification of atomized molten droplets onto a pattern for manufacturing dies, molds and related tooling.

The recent explosion of interest in rapid prototyping technology is fueled in part by the restructuring of today's marketplace. Successful competition in global markets will require the ability to carry a design concept through the prototype stage to the production stage faster and at lower cost than ever before. The ability to generate plastic and wax models of prototype parts with high dimensional accuracy via selective laser sintering, stereolithography, and other approaches is now a reality. The rapid production of prototype parts from engineered materials (i.e., materials that will actually see service) is a prime goal of industry. Methodologies that can rapidly produce specialized tooling, such as molds and dies, would satisfy this goal when used with conventional manufacturing techniques such as injection molding, blow molding, compression molding, stamping and die casting.

Presently, complex molds, dies and related tooling produced by conventional machining methods are expensive and time consuming to make. Costs can easily exceed hundreds of thousands of dollars and fabrication can require months of effort to produce molds with highly accurate dimensions and tolerances within a few mils or less.

As a consequence of the various disadvantages of conventional machining methods, thermal spray forming processes have been developed for fabricating dies whereby a deposition of a metallic layer on a plaster or metal casting is used to produce the die shell. These conventional processes utilize wire or powder feedstocks and are currently limited to a maximum spray rate of approximately 15 grams per second. Conventional thermal spray processes produce relatively large droplets, generally with mass median diameters in the order of magnitude of 100 $\mu$m and with a rather broad distribution of droplet size. Due to the large droplet size, low deposition rate, and heat content associated with conventional spray processes, solidification of the deposited droplets results in relatively poor microstructure, poor mechanical properties, porous deposits and limited material choices. Most high strength metals, including low-carbon, tool, hardfacing and stainless steels have high melting temperatures, thereby limiting the choice of materials used for the pattern or requiring a protective coating on the pattern to protect the pattern from the high temperature metal if conventional spray techniques are to be used. Conventional thermal spray techniques also require feedstocks in the form of metal powders or wires which are relatively expensive and limit material choices.

It is therefore an object of this invention to provide an improved spray forming system for the manufacture of molds, dies and related tooling by controlling the in-flight a cooling of atomized droplets, thereby controlling the temperature and solidification of the droplets that are deposited on a pattern.

It is another object of this invention to provide a spray forming system for the manufacture of molds, dies and related tooling by controlling the temperature and composition of a quench gas contained within a chamber through which the atomized droplets are directed.

Additional objects, advantages and novel features of the invention will become apparent to those skilled in the art upon examination of the following and by practice of the invention.

SUMMARY OF THE INVENTION

To achieve the foregoing and other objects, the spray forming system of the present invention provides a method for manufacturing net shape molds, dies and other tooling with excellent pattern surface finish replication by controlling the deposition conditions of droplet size, velocity, heat content, flux and flow pattern. It is also understood that the quality of the spray formed mold, die, or other tool reflects the interplay of the above mentioned properties of the spray (e.g., droplet size, velocity, liquid fraction, etc.) with the properties of the substrate (e.g., surface finish and smoothness, temperature, thermal diffusivity and thermal conductivity). Polymers are ideal to use as patterns for spray forming because they conduct heat very poorly and can be made into complex shapes with excellent surface finish. Polymers are limited however, by their maximum use temperature which is lower than many other pattern materials such as ceramics. Incoming metal droplets remain fluid longer, which in turn allows them to fuse together and better replicate the surface of the pattern. These conditions are dependent upon the relative thermophysical properties of the sprayed liquid, such as surface tension, density and viscosity, as well as the heat content and solid fraction of the atomized droplets. Droplets which form the initial layer of deposit must conform to the surface of the pattern in a controlled manner and solidify rapidly. Only small, highly undercooled droplets or droplets with low solid fraction can meet both criteria and can be produced by the technique of the present invention. A high deposition rate of these droplets helps to ensure a highly dense deposit.

In accordance with the spray forming technique of the present application, a system is provided whereby a liquid is fed or aspirated into a nozzle, through which is flowing a high temperature, high velocity gas. The liquid can be any material in liquid form, preferably however, the liquid is a molten metal or metallic alloy, or a polymer in solution or molten form. The gas atomizes the liquid into fine droplets which are then directed toward the pattern to be replicated. The atomized droplets are generally spherical and of a uniform size, typically approximately less than 50 microns. The small, uniform size of the atomized droplets permits an excellent replication of the pattern which is evidenced, for example, by the similarity in surface roughness of the deposit and pattern. The amount of heat transferred to the pattern is much less than that of the molten metal starting material due to the high convection cooling rates in the spray and at the pattern. The atomized droplets are rapidly quenched while still in-flight toward the pattern. This is accomplished by convection heat transfer to relatively cold gas within a spray chamber being entrained by the spray jet. Entrainment provides a heat sink for cooling atomized droplets, thereby allowing undercooled and partially solidified droplets to be formed in-flight. To rapidly quench the in-flight atomized droplets, the spray plume can be directed through a quenching gas having controlled temperature and composition. To further enhance the quench rate of the atomized droplets, the quenching gas can initially be in the form of a cryogenic liquid, which when it comes into contact with the spray jet becomes a gas. The quenching gas can be nitrogen, helium, argon, oxygen or air, or any combination of these gases.

Analysis of the spray formed deposit also indicates the deposited material is close to theoretical density, and has excellent mechanical properties. The present system is capable of spraying aerosols containing solid particles which are intermixed with the atomized droplets. By spraying the particles with the atomized droplets, a composite mold is formed. The composite mold formed can be a metal or polymer matrix composite.

In another embodiment of the invention, more than one kind of liquid material can be sprayed. This is accomplished by having more than one controlled feed into the nozzle, or alternatively, by having more than one nozzle. The separate liquids are each atomized and co-deposited onto the pattern to produce functionally gradient deposits and/or clad deposits.

BRIEF DESCRIPTION OF THE DRAWINGS

The present invention is illustrated in the accompanying drawings where:

FIGS. 4A, 4B and 4C show the geometrical parameters and experimental data used to generate the graph of FIG. 4.

DETAILED DESCRIPTION OF THE INVENTION

Figure 1:
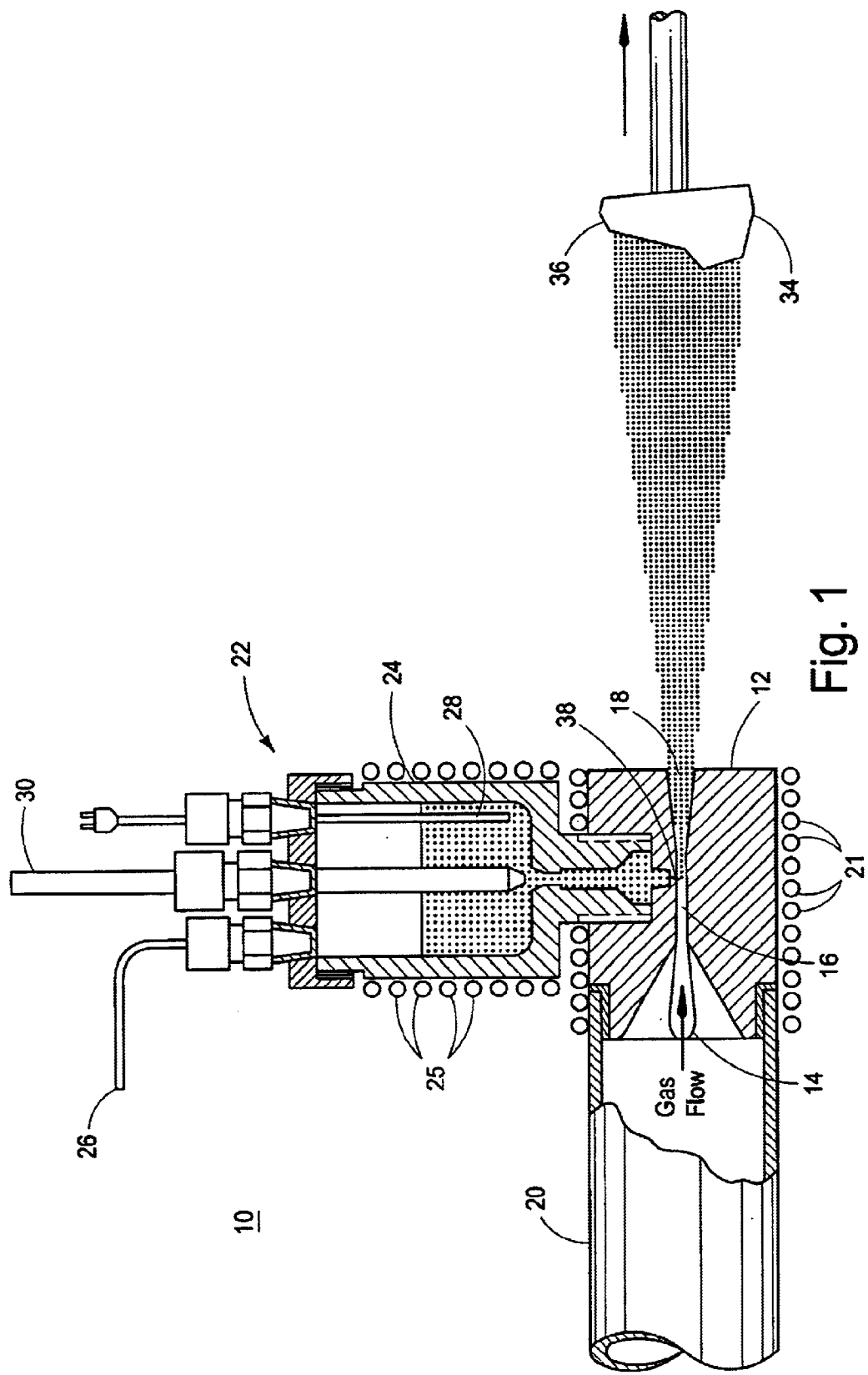
FIG. 1 is a sectional illustration showing a preferred embodiment of the spray forming device of the present application.

Referring now to the drawings in which like numerals represent like elements throughout the several views, the preferred embodiment of the present invention will be described. FIG. 1 shows the spray forming device 10 of the present invention. The device 10 comprises a spray nozzle 12 having a gas inlet 14 portion which converges to a choke portion 16 and then diverges outwardly to an exit portion 18. Preferably the nozzle is a linear nozzle (i.e. vertical plane of symmetry down the center of the nozzle along its length) having a converging geometry (i.e., a nozzle flow channel which converges from its inlet end to a choke portion located at the nozzle's outlet end) or a converging/diverging (de Laval) geometry or is designed pursuant to the method of U.S. Pat. No. 4,919,853 of Alvarez et al. The temperature of the gas, sprayed liquid and nozzle are controlled independently. Conventional heating methods such as resistance heating, induction heating, electron bombardment heating and others are applicable. The temperature of the gas entering the nozzle is controlled by a gas heater 20 connected to the nozzle. Preferably the temperature of the atomizing gas entering the nozzle is in the range 20° C. to 2000° C. It is important to maintain a nozzle temperature high enough to prevent the sprayed material from freezing before it is atomized. Therefore, heating elements 21 for the nozzle are provided.

A feed assembly 22 is positioned so that the liquid is fed or aspirated near the choke portion of the nozzle from the liquid reservoir 24. However, in alternate embodiments of this invention, the liquid is pressure fed or aspirated through a conduit 38 ending proximate to the flow channel longitudinal axis at locations other than near the choke portion. For example, the liquid may be fed between the flow channel inlet and the choke portion or between the choke portion and the flow channel outlet end.

An inert atmosphere within the reservoir can be provided through a gas inlet 26 which also is used to provide a positive pressure within the reservoir. The inert atmosphere limits the detrimental effects of atmospheric contamination. By providing a pressurized liquid feed, increased atomizing gas pressure through the nozzle can be used and larger throughputs of liquid material are possible. Another major advantage of using a pressurized liquid feed is that it provides greater control of the operating characteristics (i.e., temperature, velocity, droplet size, droplet size distribution) over conventional techniques.

In order to maintain proper temperature control of the liquid material, the reservoir is heated by heating elements 25. A thermocouple 28 measures the temperature of the liquid material within the reservoir. The flow of liquid from the reservoir to the nozzle is controlled by use of a stopper rod 30, whose position also provides partial control of the liquid feed rate. Flow of the liquid from the reservoir is also controlled by the nozzle gas flow rate (nozzle pressure).

Preferably the gases used are compatible with the material being sprayed and generally include gases, such as argon, nitrogen, helium, air, oxygen and neon, which do not react with the liquid being sprayed or with components of the spray apparatus. However, in some cases it is desirable to use an atomizing gas which may react with the sprayed material in a predesigned, way to improve the properties of the sprayed material. For example, atomizing low carbon steel alloyed with aluminum, with nitrogen gas results in the formation of fine aluminum nitride particles that act as grain boundary pinning sites to refine the steel's microstructure.

The liquid is fed or aspirated through one or more orifices into the nozzle which is transporting a high temperature gas at flow velocities ranging from high subsonic through supersonic velocities. Preferably, a flow velocity is used which provides satisfactory atomization of the liquid while minimizing gas usage. Also, preferably the pressure of the atomizing gas at the flow channel inlet is in the range of between 100 kPa to 700 kPa. The gas disintegrates the liquid and entrains the resultant droplets in a highly directed two phase (or multiphase) flow. During gas atomization, a liquid is disintegrated into relatively fine droplets by the action of aerodynamic forces that overcome surface tension forces which consolidate the liquid. The liquid's viscosity and density also influence atomization behavior, but typically play a more secondary role. Viscosity affects both the degree of atomization and the spray pattern by influencing the amount of interfacial contact area between the liquid and gas. Viscous liquids oppose change in geometry more efficiently than low viscosity liquids, making the generation of a uniform spray jet more difficult for a given set of flow conditions. The density of the liquid influences how the liquid responds to momentum transfer from the gas. Light liquids accelerate more rapidly in the gas jet. Disintegration efficiency is reduced because atomization takes place at lower relative velocities.

The atomized liquid droplets are directed to a pattern 34 upon which a deposit 36 of the rapidly cooled sprayed material is formed. Means can be provided for the relative movement between the pattern 34 and the spray forming device 10 (e.g., pattern manipulator 35 of FIG. 5). Using the spray forming device of the present application permits a wide selection of pattern materials. For example, the pattern may be made from such material as a glass, clay, wax, polymers, woods, metals, ceramics, paper. Materials that are easily shaped, provide a smooth surface finish, and can withstand the temperature of the spray without failure, are particularly useful with the present invention because the fine and uniform size of the droplets sprayed according to the system of the present invention are able to replicate fine surface detail and surface roughness of the pattern. Patterns produced using rapid prototyping (solid free form fabrication) methods such as stereolithography, selective laser sintering, fused deposition modeling, laminated object manufacturing, etc., are very useful because they allow patterns to be produced rapidly. Materials currently used by these methods can be used directly as tool patterns with low melting point alloys such as tin-base or zinc-base alloys or can be used to cast a ceramic or plaster tool pattern for use with high melting point alloys such as tool steels.

Materials capable of being sprayed by the spray forming technique of the present application include, pure molten metals (such as aluminum, zinc or copper, for example), metal alloys including tin alloys, aluminum alloys, zinc alloys, copper alloys, steel, bronze, brass, stainless steel, tool steel and others.

Liquid metals are characterized by moderately high viscosity, high density, and very high surface tension compared to common liquids such as methanol, water, and acetone. These properties and the intrinsic high temperature requirements, make the atomization of liquid metals more difficult than with most liquids. As a result, liquid metal spray forming nozzles need to be designed to provide good gas/metal coupling with efficient kinetic energy transfer from the gas to the metal. In linear de Laval nozzles used in the method of the present invention, the liquid metal enters the flow channel with a small axial velocity. There it contacts a high velocity, high temperature inert gas. High temperature gas is used to help maintain the liquid metal in a fluid state throughout breakup as well as to help prevent the liquid metal from freezing as it enters the gas flow channel. Relatively large droplets or sheets form initially, which then undergo secondary atomization by various mechanisms depending upon local flow patterns, flow velocity, mass loading and the physical properties of the gas and liquid metal.

The dynamics of droplet breakup in high velocity flows is quite complex. Historically, the Weber number (We) has been a useful predictor of breakup tendency. The Weber number is the ratio of inertial forces to surface tension forces and is represented by the following equation:

$$We = \frac{\rho V^2 D}{2\sigma}$$

where $\rho$ is the density of the gas, V is the initial relative velocity between the flow field and the droplet, D is the initial diameter of the droplet, and $\sigma$ is the surface tension of the droplet. Breakup of liquid droplets will not occur unless the Weber number exceeds a critical value. Upon exiting the nozzle, the two phase (or multiphase) flow entrains relatively cold ambient gas. Examples of ambient gases capable of being utilized in the subject invention include nitrogen, argon, air, oxygen and any combinations thereof. This provides a heat sink for the atomized droplets, producing droplet populations in undercooled, liquid, solid and semi-solid states. As used throughout this application, the term "undercooling" is understood to mean cooling below the temperature at which an equilibrium phase transformation can take place without actually obtaining the transformation. Undercooling in atomized droplets involves the postponement of nucleation phenomena and is enhanced as droplet size decreases and cooling rate increases. At some point, the heat release rate within the droplet due to the liberation of the latent heat of transformation from all the nucleation sites becomes larger than the heat transfer rate to the environment, and the temperature of the droplet rises. Multiple nozzles, or multiple feed ports on a single nozzle can be used for codepositing more than one metal, ceramic or polymer.

Figure 2:
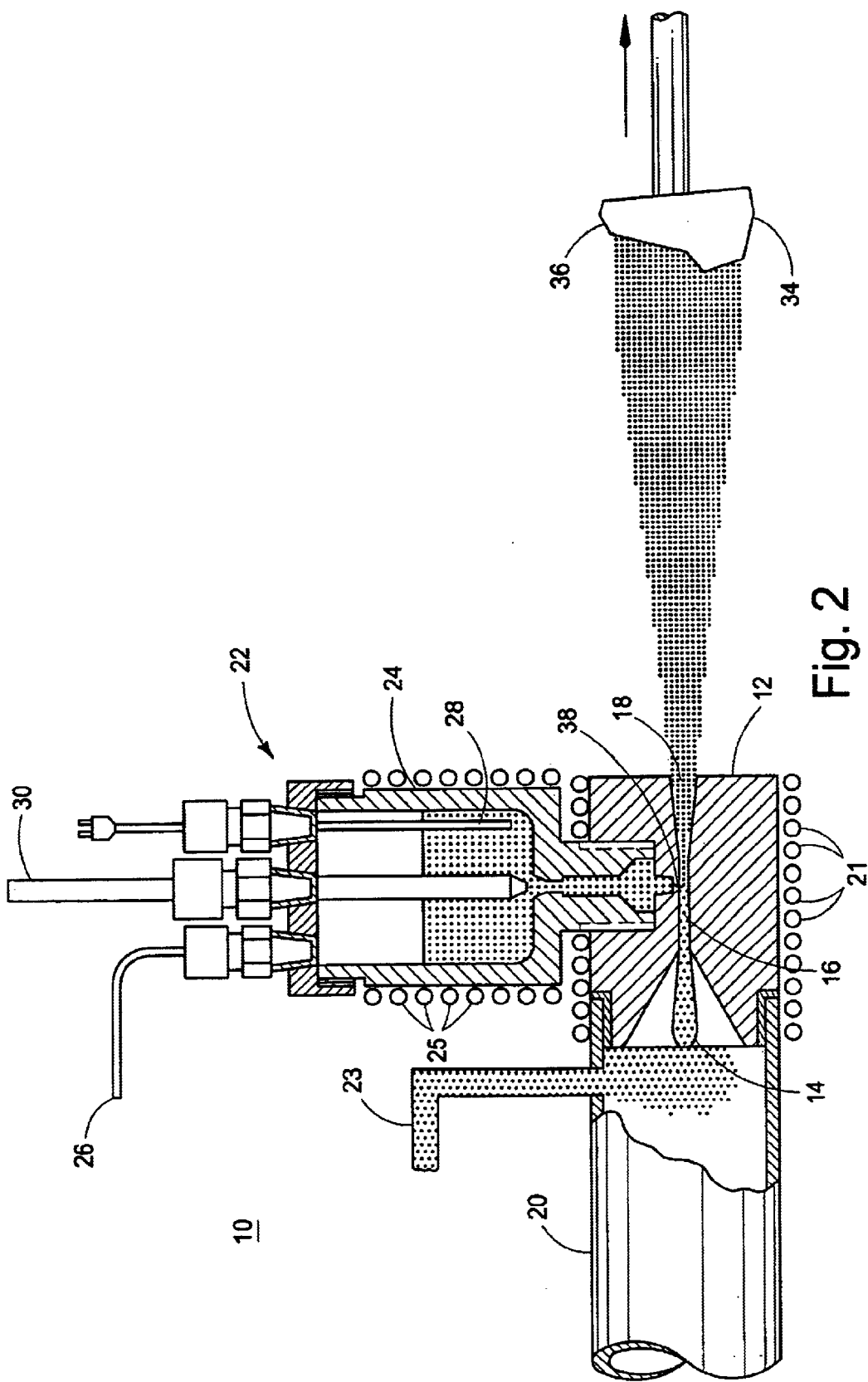
FIG. 2 is a sectional illustration of an alternate embodiment of the present invention wherein an aerosol containing solid particles is utilized.

As shown in FIG. 2, aerosols containing solid particles 23 can also be fed into the nozzle through feed line 27 and sprayed with a molten metal or polymer when spray forming particulate reinforced metal or polymer matrix composites. For example, metal matrix composites such as aluminum metal reinforced with silicon carbide particulate or fibers, can be spray formed by the technique of the present invention. A second feed port is used to introduce the ceramic material. The reinforcement phase is fed into the nozzle in the form of an aerosol upstream of the entry location of the molten metal. The particulate enters the nozzle at or near room temperature, but is quickly heated by the atomizing gas to the desired temperature. The liquid metal is heated above its liquidus temperature, is aspirated or pressure fed into the nozzle, atomized and codeposited with the reinforcement phase. Gas and liquid metal temperature control allows control of the extent of matrix/particulate wetting and interfacial reactions. The transit time of the multiphase flow to the substrate is on the order of milliseconds, with droplet cooling rates greater than $10^3$ K/sec. Upon impacting the substrate matrix, solidification rates are expected to be high, significantly restricting macrosegregation effects which are often observed in slowly cooled cast composites. This approach therefore largely bypasses two major problem areas experienced in most particulate reinforced metal matrix composites fabrication methods—control of matrix/particulate interfacial reactions and wetting, and nonuniform blending caused by density differences between the matrix and reinforcement phases. For some combinations of metal and ceramic, the ceramic particulate can be added to the crucible and fed into the nozzle through the same feedport. This approach requires that the metal and ceramic not react in an extreme way and that the molten metal be agitated vigorously to keep the ceramic uniformly distributed in the melt due to the difference in density of metal and ceramic.

Polymers can be sprayed using the present invention by feeding a molten or plastisized polymer, by in-flight melting of polymer powders fed into the nozzle in aerosol form, or more typically, by dissolving the polymer in an appropriate solvent and spraying the solution. High temperature gas facilitates in-flight evaporation of the solvent from the atomized droplets, and the remainder of the solvent is evaporated at the pattern. As with metals, polymers can also be codeposited with ceramics to form polymer matrix composites.

Figure 3:
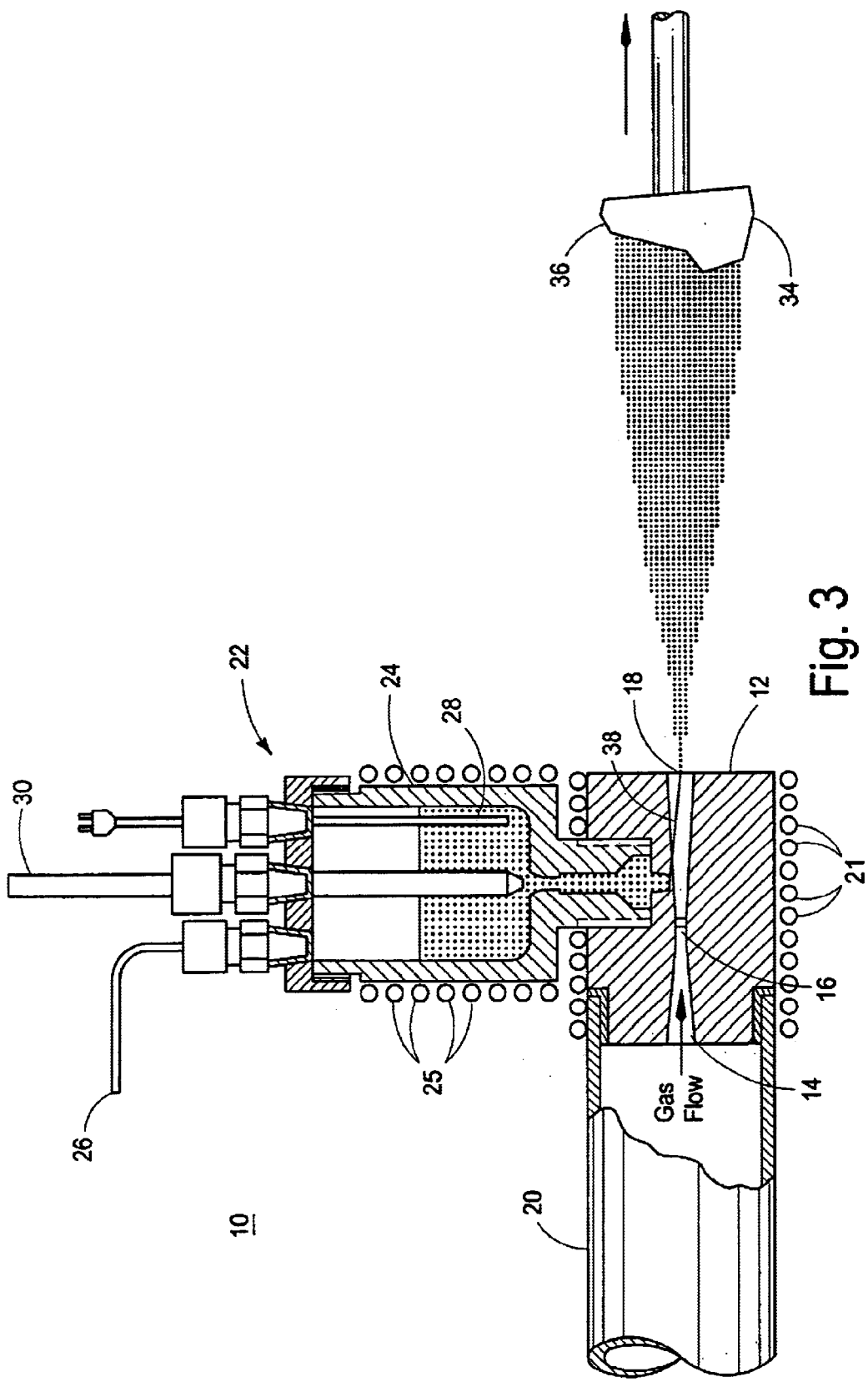
FIG. 3 is a sectional illustration of an alternate embodiment of the spray forming device of the present application.

The nozzle/feed assembly is designed to produce sprays of very fine droplets having a narrow size distribution. These conditions offer the greatest flexibility for controlling droplet temperature, momentum and flow pattern, as well as the resultant microstructure of the deposit. FIG. 3 shows an alternate embodiment of the present invention and differs from the device shown in FIG. 1 in that the liquid orifice(s) (i.e., the orifices through which the liquid flows before entering the flow channel of the nozzle), are located in the diverging section of the nozzle near the exit of the nozzle. In contrast, in FIG. 1, the orifices are located upstream of the nozzle's throat. In the devices shown in FIG. 1 and FIG. 3 liquid enters the flow channel through tubes 38 which terminate near the longitudinal axis of the flow channel of the nozzle where the gas velocity is generally highest. This provides the greatest dynamic pressure for atomization of the liquid and often times provides the most finely atomized droplets. Furthermore, by feeding the liquid proximate to the flow channel longitudinal axis, the present invention eliminates the disadvantage of conventional spray forming techniques of agglomeration of the atomized droplets on the side walls of the flow channel. The agglomeration of droplets on the side walls of the flow channel results in larger diameter droplets being directed toward the pattern. To further ameliorate this situation, an alternate embodiment of the present invention is the feeding of the liquid into the flow channel near the flow channel outlet. Spray nozzles have been designed, constructed and operated with the liquid orifices located at various locations along the length of flow channel and at various locations within the flow channel of the nozzle. Moreover, nozzles have been designed, constructed, and operated which utilize a single slit-shaped liquid orifice or a set of tubes that span the width of the nozzle. Therefore, FIGS. 1 and 2 are provided as two examples, without limiting the scope of the technique.

Figure 4:
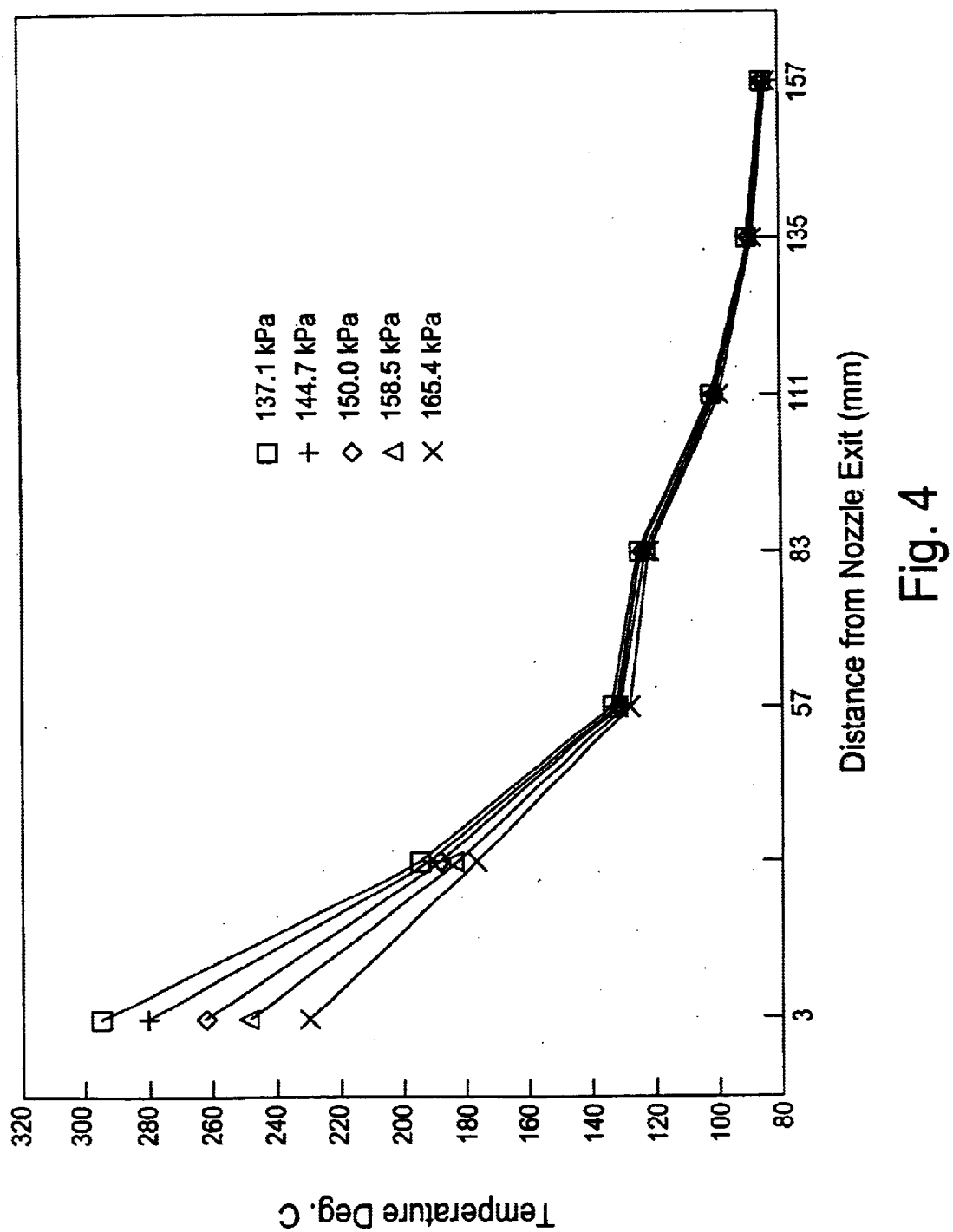
FIG. 4 is a graph showing the rapidly cooling gas temperature of the spray jet after exiting the nozzle as a function of distance from the nozzle.

The extent of in-flight cooling of the atomized droplets prior to impacting the pattern depends upon the superheat of the liquid, the droplet size, the atomizing gas temperature, the thermal conductivity and thermal diffusivity of the atomizing gas, the nozzle-to-pattern distance, the temperature and thermal properties of the quench gas, (i.e., the gas which is entrained into the spray plume outside the nozzle), and other factors. FIG. 4 is a graph illustrating the influence the quench gas has on cooling the gas jet after it exits the nozzle. The data shown in FIG. 4 was generated by flowing high temperature (about 500° C.) argon gas through a spray nozzle at various nozzle inlet pressures ranging from 137 kPa (20 psia) to 165 kPa (24 psia). The temperature of the gas jet after it exits the nozzle is plotted against distance from the nozzle's exit plane. Room temperature argon gas was entrained into the jet causing the temperature of the gas in the jet to decrease with increasing distance from the nozzle. This cooling effect provides a heat sink for cooling atomized droplets, thereby allowing undercooled and partially solidified droplets to be formed in flight. FIGS. 4A, 4B and 4C show the geometrical parameters (FIG. 4A) and experimental data (FIGS. 4B and 4C) used to generate the curves of FIG. 4. Seven thermocouples (TC#1 through TC#7) were spaced in the gas jet down stream of the exit of the nozzle at the distances shown in FIG. 4B.

Figure 5:
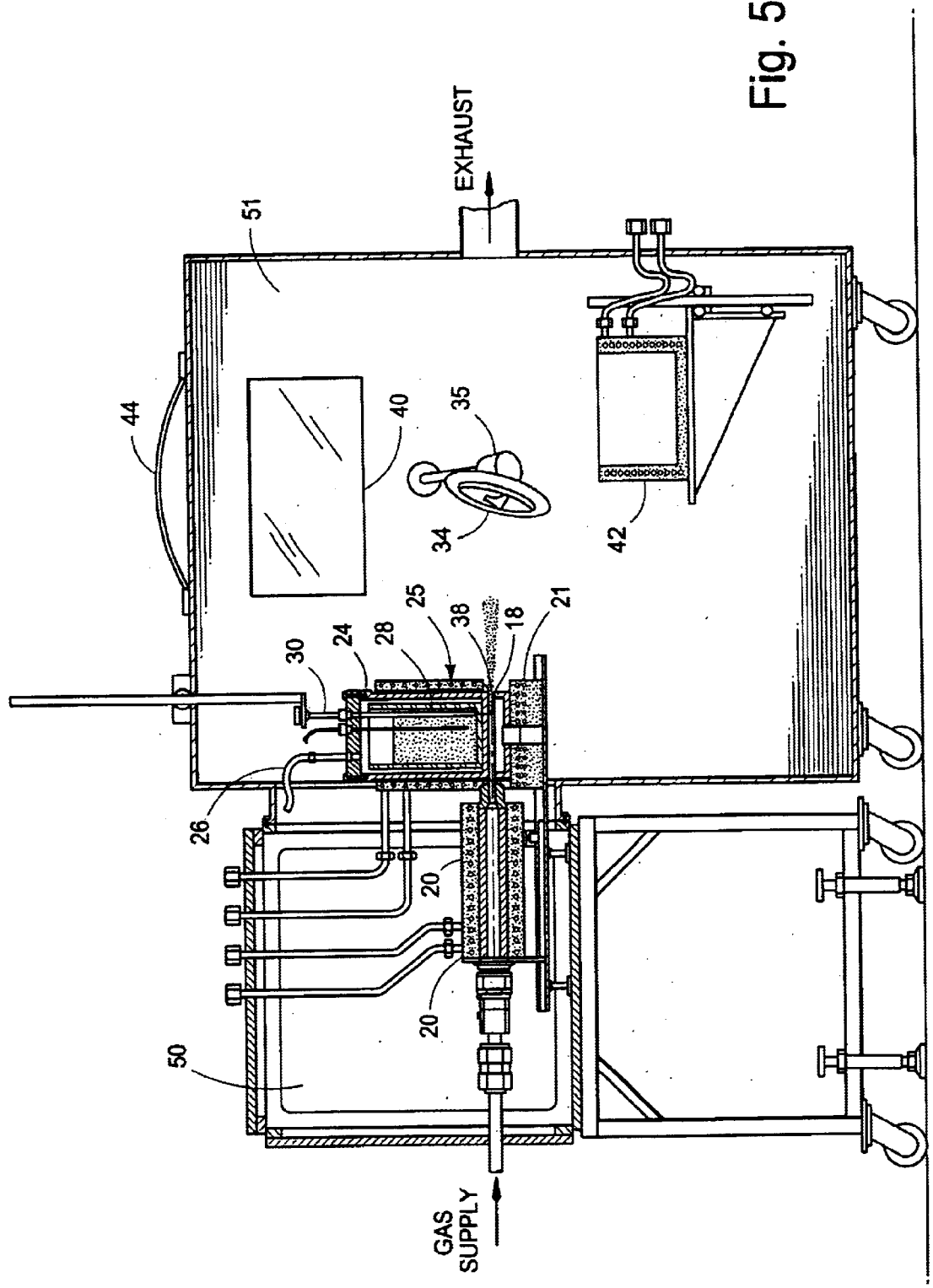
FIG. 5 is a sectional illustration showing the spray forming system of the present application.

FIG. 5 shows the nozzle assembly of the present invention contained within a nozzle chamber 50 and a spray chamber 51 in which the atomized droplets are directed toward the pattern. By controlling the temperature, pressure and composition of the quench gas contained within the spray chamber 51, the present invention is capable of finely controlling the cooling rate of the atomized droplets prior to the droplets impacting upon the pattern. Low temperature quench gas provides rapid cooling of droplets, while preheated quench gas reduces the cooling rate of the droplets. Quench gas may consist of cryogenic gas (and liquid) tapped directly off a liquid nitrogen tank to rapidly quench the spray plume. In other experiments, cryogenically cooled helium gas served as the quench gas. Alternatively, inert gas (e.g., argon, helium, etc.) at room temperature or warmed to less than 500° C. has been used as the quench gas. The spray chamber 51 also may provide for an observation window 40 and rupture disk 44. Pattern induction furnace may be provided to control the temperature of the pattern on which the atomized droplets are deposited.

For a better understanding of the present invention, the following examples are provided to illustrate the spray forming technique.

Experimental Studies

Bench-scale nozzles having transverse throat widths of 17 mm were typically operated at gas-to-metal mass ratios (for tool steel) of approximately 1, with metal throughputs of about 4 Kg/s per meter of nozzle throat width.

In one study, a metal mold weighing 5 Kg was produced in about 3 minutes by spray forming P-20 tool steel onto a ceramic (alumina) pattern having a complex shape. Replication of surface features, including fine scratches in the pattern, was excellent. The mechanical properties of the mold (strength, hardness, etc.) were comparable to those of a mold machined from commercial forced prehardened material and the mold was found to produce a comparable number of plastic injection molded parts.

Bench-scale nozzles having transverse throat widths of 17 mm were typically operated at gas-to-metal mass ratios (for tin) of approximately 10, with metal throughputs of about 500 g/s per meter of nozzle throat width.

In one study, a metal mold weighing 250 grams was produced in about 5 minutes by spray forming tin onto a low-density polyethylene pattern having a complex shape. The pattern was not damaged despite the fact that the temperature of the molten metal within the reservoir was 300° C., which greatly exceeded the melting point of the pattern (~100° C.). Replication of surface features, including fine scratches in the pattern, was excellent. The surface of the mold at the deposit/pattern interface was mirror-like indicating that peak-to-valley surface roughness was likely less than about 26 nanometers. Patterns of a variety of other plastics, including, poly(methyl methacrylate), polycarbonate, polyvinyl chloride and polystyrene have also given good results, as have advanced high temperature polymers such as polyimide and polyetherimide.

The as-deposited grain structure observed in this experimental study was equiaxed with a fairly narrow range of fine (~6 to 15 $\mu$m) grain sizes—much finer than the massive grains found in conventional cast objects. As-deposited density, measured by water displacement using Archimedes' principle, was typically in the range of 88 to 97% of theoretical depending upon spray conditions.

Figure 6:
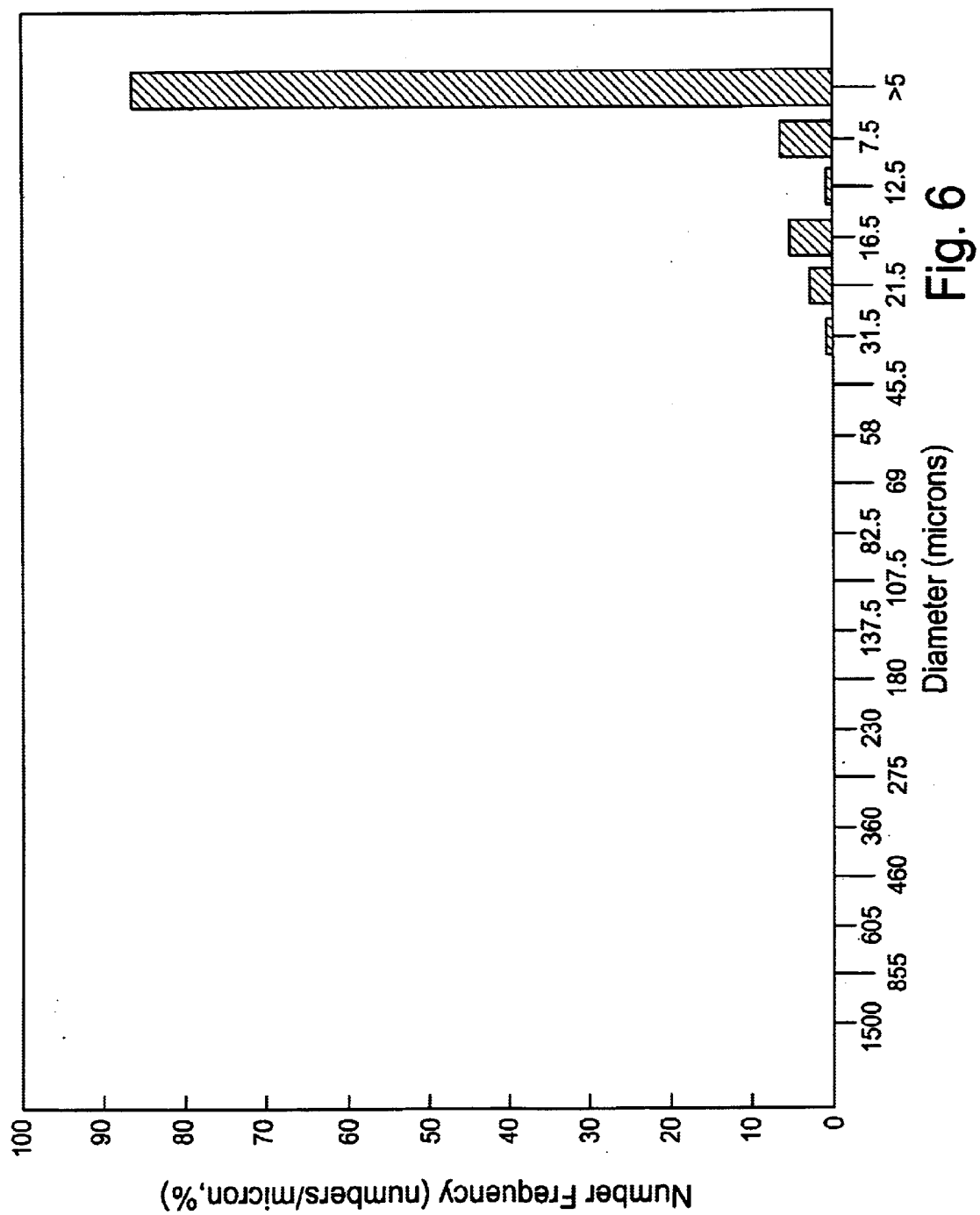
FIG. 6 is a histogram plot showing the count frequency distribution versus powder size of tin sprayed according to the method of the present invention.
Figure 7:
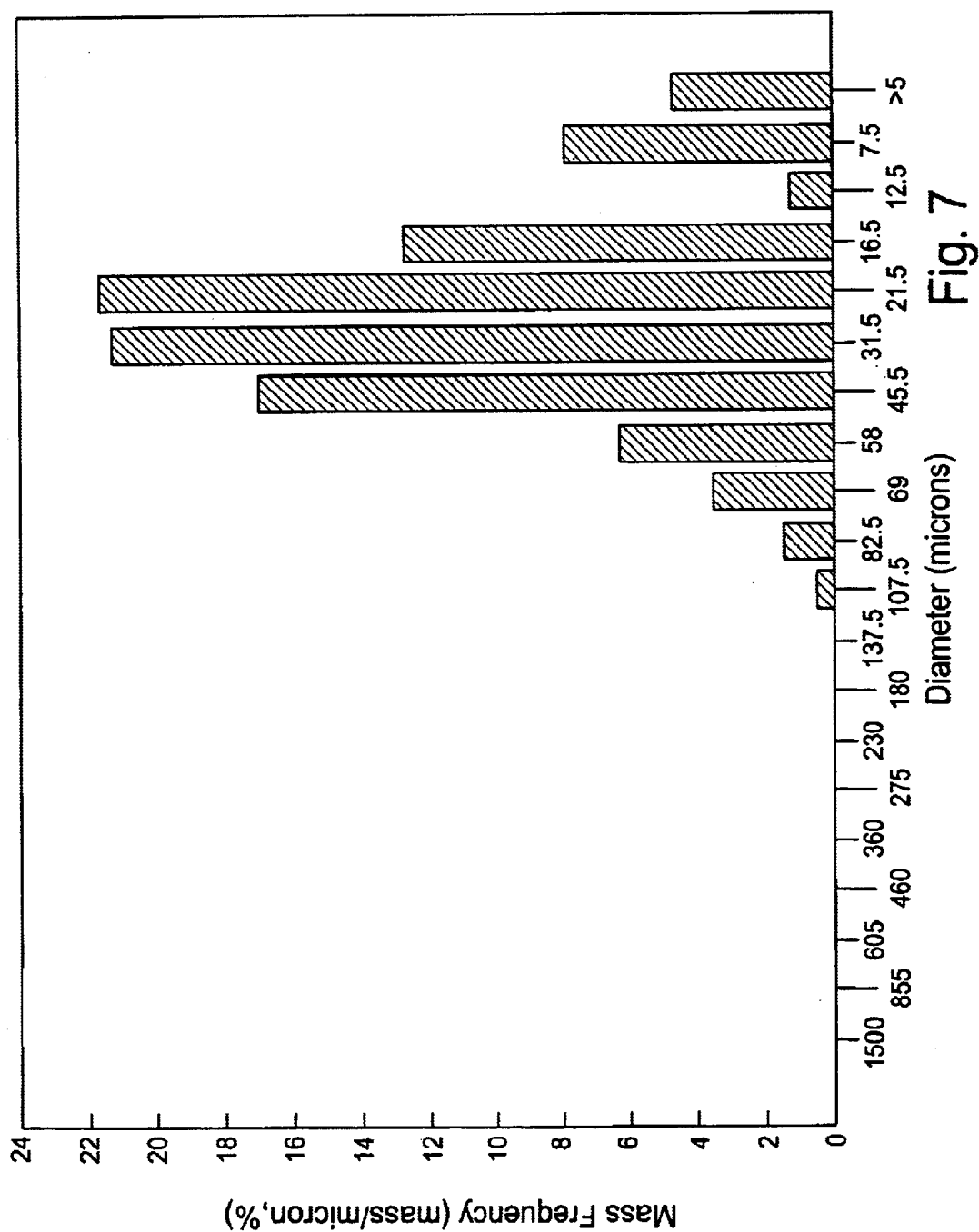
FIG. 7 is a histogram plot showing the mass frequency distribution versus powder size of tin sprayed according to the method of the present invention.

The molten metal used to produce the deposit was very finely atomized. Unconsolidated powder was collected and analyzed by wet and dry sieving through fine mesh screens of 300, 250, 210, 150, 125, 90, 75, 63, 53, 38, 25, 18, 15, 10 and 5 μm. Few particles larger than 125 μm were observed. FIG. 6 is a histogram plot that gives the count frequency distribution versus powder size. The ordinate gives the count frequency normnalized for the sieve size range, expressed as a percentage of the total counts. The plot indicates that about 85% of the powder particles were <5 μm in diameter. The average particle size was calculated to be 4 μm. FIG. 7 shows a histogram plot that relates mass frequency to powder size for the same tin powder sample, again normalized for the size range of the sieves. When compared with FIG. 6, this distribution reflects the significance of the mass weighting factors (which go as $d^3$, where d is the diameter of the powder particle) imposed by relatively small numbers of more massive particles. The mass median diameter, volume mean diameter, and Sauter mean diameter of the powder were, 23 μm, 31.3 μm, and 23.2 μm. The geometric standard deviation was 1.5, indicating a narrow droplet size distribution in the spray plume. SEM analysis indicated that nearly all the particles were spherical. Similar spray conditions were used to spray form a semispherical tin shell using an inflated party balloon as the pattern without bursting the balloon.

As another example, GMR 311, a forming-die (Kirksite) alloy having the nominal composition 3% Al, 11% Cu, Zn bal., was spray formed into a complex shape using a poly (methyl methacrylate) (i.e., Lucite™ and Plexiglass™) pattern. The alloy was superheated to 600° C. and deposited onto the pattern, which has a melting point of about 80° C., to form a free-standing mold which again replicated the surface features of the pattern extremely well without damaging the pattern. Cold helium and nitrogen have been used as quench gases, as well as room temperature argon. The spray-formed mold weighed about 700 grams and was formed in about ten minutes. Complex molds of this material have also been spray formed using low-density polyethylene patterns such as children's sand toys. The zinc-based die-casting alloy, alloy 3 (Zn, 4% Al), has also been spray formed to form complex free-standing molds using low density polyethylene patterns.

Other high melting point alloys have successfully been spray formed to produce free-standing tooling using the apparatus and methods of the present invention with excellent surface features and shape replication. As-deposited photomicrographs of a sectioned low carbon steel (SAE 1008) sample deposited using the present invention, show that the grain structure is near-equiaxed ferrite, with an average grain size of 16 μm. This highly refined as-deposited average grain size is similar to that found for commercial low-carbon steel hot band. The spray nozzle operated at a static pressure of 206 kPa (30 psia) absolute, measured at the nozzle's inlet. Under single-phase flow conditions, the gas flow field was mapped out using small pitot tube probes. Results indicated that this driving pressure generated supersonic flow conditions with the shock front located in the diverging section near the metal feed location. Gas-to-metal mass ratios were typically about 10. Gas and droplet temperature fell rapidly after exiting the nozzle as the spray plume entrained cool argon. Gas and droplet velocity decreased after exiting the nozzle with larger droplets responding less to drag effects by virtue of their greater momentum. The steel was induction heated to about 1600° C. and atomized using argon or other inert gas heated to about 1000° C. As-deposited density of the tool, measure by water displacement using Archimedes' principle, was in the range of 88 to 97% of theoretical density, with 96% being typical.

The ultimate tensile strength of a sectioned aluminum alloy 6061 tool produced by the system of the present invention was measured to be 166 MPa (24 ksi) which is about a 33% improvement in ultimate tensile strength over the wrought, annealed commercial material. This improvement in strength is presumably due to grain structure refinement. This material has been successfully spray deposited onto a variety of pattern materials, including common glass, located about 20 inches from the exit of the nozzle. Argon gas was used as the atomizing gas, and the quench gas was maintained at or near room temperature. Metal mass throughputs were typically 185 g/s per meter of nozzle throat width. The liquid metal was heated about 100° C. above its liquidus temperature and the atomizing gas was heated to about 700° C. The spray nozzle operated at a pressure of about 206 kPa (30 psia) absolute, measured at the nozzle's inlet.

An unetched, polished photomicrograph of a sectioned particulate reinforced metal matrix composite tool produced using the system of the present invention revealed a uniform distribution of silicon carbide particles embedded in an aluminum alloy 6061 matrix. Particulate volume fractions have ranged from 4 to 15% as determined by acid dissolution of the matrix, for various spray forming experiments. Higher or lower volume fraction are possible. The composites were produced using matrix spray conditions similar to those described in the preceding paragraph. The ~13 μm SiC particulate was codeposited with the matrix material by injecting an Ar/SiC aerosol into the nozzle upstream of the entry location of the liquid aluminum. The particulate entered the nozzle at or near room temperature, but was quickly heated by the atomizing gas to the desired temperature. Independent temperature control of the metal and particulate phases allows flexibility for controlling the extent of matrix/particulate wetting and interfacial reactions.

A linear polyphosphazene polymer (poly[bis(phenoxy) phosphazene] (PPOP)) deposit was formed using the system of the present invention. The polymer deposit was formed by depositing atomized droplets of linear PPOP dissolved in tetralhydrofuran (THF) onto patterns of glass and other materials. The spray was generated using a linear converging-diverging (de Laval) geometry nozzle machined from commercial boron nitride rod. Seven percent (by weight) solution of linear PPOP in THF was sprayed. The weight average molecular weight of the polymer was measured to be about 750,000 amu by gel permeation chromatography. Five percent and three percent solution having a polymer weight average molecular weight exceeding one million amu were also sprayed but were found to give less satisfactory results. The solution was warmed to ~45° C. to lower its viscosity and poured into the tundish of the nozzle operating at a static pressure of 137 kPa (20 psia). The solution was aspirated through six small orifices that spanned the width of the nozzle. Solution throughput was about 0.4 Kg/second per meter of nozzle throat width. The corresponding gas-to-polymer solution mass ratio was about 4. The solution was sheared and atomized, resulting in very fine droplets that were entrained by the gas stream and transported to a moving pattern. Solvent molecules were shed from the atomized particles during their flight, and the remainder of the solvent evaporated at the substrate. While control of atomizing gas temperature provided a convenient vehicle for adjusting the evaporation rate of the solvent, room temperature argon was used because the equilibrium vapor pressure of THF (147 torr at 20° C.) was high enough to allow facile evaporation of the solvent. Upon impacting the substrate, individual polymer molecules within adjacent droplets interwove while shedding any remaining solvent. The resultant polymer deposit appeared coherent and uniform. A SEM analysis of the deposit revealed that the deposit at the deposit/pattern interface was specular (i.e., it reflected light and replicated surface features on the pattern very well). The deposit surface away from this interface, however, was matte.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical application and enable others skilled in the art to utilize the invention in various embodiments and with various modifications as are suited to the particular use contemplated. It is intended that the scope of the invention be defined by the claims appended hereto.

I claim:

1. A system for the spray forming manufacture of near net shape molds, dies and related toolings, comprising:
    a nozzle having a flow channel, said flow channel having an inlet end, an outlet end and a longitudinal axis;
    a liquid reservoir in fluid communication with said nozzle flow channel, said reservoir adapted to contain a liquid material capable of forming a mold, said liquid being pressurized in a pressurized reservoir and injected from said reservoir through a conduit ending in said nozzle flow channel between said inlet and outlet ends and proximate to said nozzle longitudinal axis;
    means for flowing a high temperature atomizing gas through the nozzle flow channel from the inlet end to the outlet end at a pressure range of 20 psia to 30 psia to atomize the liquid injected into the flow channel into a plume of atomized droplets;
    a chamber adapted to contain a quench gas having a controlled temperature and composition for increasing in-flight convection cooling of the atomized droplets thereby enhancing formation of undercooled and partially solidified droplets;
    means for directing and depositing the undercooled and partially solidified droplets onto a pattern to form the mold.

2. The system of claim 1 wherein said quench gas is selected from a group consisting of nitrogen, helium, argon, oxygen, air, and combinations thereof.

3. The system of claim 1 further comprising means for independently heating the nozzle and the reservoir.

4. The system of claim 1 further comprising means for providing relative movement between the nozzle and the pattern.

5. The system of claim 1 wherein a plurality of liquid materials capable of forming a mold are injected separately into the nozzle flow channel.

6. The system of claim 1 wherein the nozzle flow channel converges to a choke portion located between the inlet end and the outlet end, and diverges between the choke portion and the outlet end.

7. The system of claim 1 wherein the liquid material is injected into the nozzle flow channel proximate to the longitudinal axis between the inlet end and the choke portion of the flow channel.

8. The system of claim 1 wherein the liquid material is injected into the nozzle flow channel proximate to the longitudinal axis between the choke portion and the outlet end of the flow channel.

9. The system of claim 1 wherein the means for injecting the liquid material into the nozzle flow channel is accomplished by pressurizing the liquid reservoir.

10. The system of claim 1 wherein the nozzle flow channel has a linear transverse cross-sectional geometry.

11. A system for the spray forming manufacture of near net shape molds, dies and related toolings, comprising:
    a plurality of nozzles, each nozzle having a flow channel, each of said flow channels having an inlet end, an outlet end and a longitudinal axis;
    a liquid reservoir in fluid communication with each of said nozzle flow channels, said reservoir adapted to contain a liquid material capable of forming a mold, said liquid being pressurized in a pressurized reservoir and injected from said reservoir through a conduit ending in said nozzle flow channel between said inlet and outlet ends and proximate to said nozzle longitudinal axis;
    a high temperature atomizing gas flowing through each of the nozzle flow channels from the inlet end to the outlet end at a pressure range of 20 psia to 30 psia to atomize the liquid injected into the flow channels into a plume of atomized droplets directed to a chamber adapted to contain a quench gas having a controlled temperature and composition for increasing in-flight convection cooling of the atomized droplets thereby enhancing formation of undercooled and partially solidified droplets;
    means for directing and depositing the undercooled and partially solidified droplets onto a pattern to form the mold.

12. The system of claim 11 further comprising means for independently heating the nozzles and the reservoirs.

13. The system of claim 11 further comprising means for providing relative movement between the nozzle and the pattern.

14. The system of claim 11 wherein a plurality of liquid materials capable of forming a mold are injected separately into the nozzle flow channel.

15. The system of claim 11 wherein the nozzle flow channel converges to a choke portion located between the inlet end and the outlet end, and diverges between the choke portion and the outlet end.

16. The system of claim 15 wherein the liquid material is injected into the nozzle flow channel proximate to the longitudinal axis between the inlet end and the choke portion of the flow channel.

17. The system of claim 15 wherein the liquid material is injected into the nozzle flow channel proximate to the longitudinal axis between the choke portion and the outlet end of the flow channel.

18. The system of claim 11 wherein the means for injecting the liquid material into each of the nozzle flow channels is accomplished by pressurizing the liquid reservoir.

19. The system of claim 11 wherein each of the nozzle flow channels has a linear transverse cross-sectional geometry.

20. A system for the spray forming manufacture of near net shape molds, dies and related toolings, comprising:
    a nozzle having a flow channel, said flow channel having an inlet end, an outlet end, and a longitudinal axis;

a plurality of reservoirs in separate fluid communication with said nozzle flow channel, at least one of said reservoirs adapted to contain under pressure a liquid material capable of forming a mold and injected from said reservoir through a conduit ending in said nozzle flow channel between said inlet and outlet ends and proximate to said nozzle longitudinal axis;

means for flowing a high temperature atomizing gas through the nozzle flow channel from the inlet end to the outlet end at a pressure range of 20 psia to 30 psia to atomize the liquid injected into the flow channel into a plume of atomized droplets directed to a chamber adapted to contain a quench gas having a controlled temperature and composition for increasing in-flight convection cooling of the atomized droplets thereby enhancing formation of undercooled and partially solidified droplets;

means for directing and depositing the undercooled and partially solidified droplets onto a pattern to form the mold.

21. The system of claim 20 wherein at least one of said plurality of reservoirs contains solid particles, said solid particles being injected into said nozzle flow channel between said inlet and outlet ends and proximate to said flow channel longitudinal axis, said injected solid particles thereby mixing with the injected liquid materials and codeposited onto a patter to form the mold.

* * * * *